United States Patent [19]

Barbieux

[11] Patent Number: 4,812,091

[45] Date of Patent: Mar. 14, 1989

[54] EXCHANGE SYSTEM ON AN IRREMOVABLE MACHINING CENTER

[75] Inventor: Jacques Barbieux, Louvres, France

[73] Assignee: Sandvik Tobler S.A., Louvres, France

[21] Appl. No.: 16,367

[22] Filed: Feb. 19, 1987

[30] Foreign Application Priority Data

Mar. 6, 1986 [FR] France ................. 86 03131

[51] Int. Cl.[4] ........................................... B23B 31/26
[52] U.S. Cl. ..................................... 409/233; 408/16; 409/234
[58] Field of Search ................. 409/232–234; 408/16

[56] References Cited

U.S. PATENT DOCUMENTS

| 4,504,824 | 3/1985 | Mello | 408/6 X |
| 4,643,623 | 2/1987 | Kondo et al. | 409/232 |
| 4,658,687 | 8/1987 | Hall et al. | 279/110 X |

FOREIGN PATENT DOCUMENTS

| 724892 | 9/1938 | Fed. Rep. of Germany . |
| 1602774 | 4/1970 | Fed. Rep. of Germany . |
| 2061028 | 5/1972 | Fed. Rep. of Germany . |
| 3045536 | 7/1982 | Fed. Rep. of Germany . |
| 2112874 | 7/1972 | France . |
| 2545023 | 6/1986 | France . |
| 2576235 | 7/1986 | France . |

Primary Examiner—Gil Weidenfeld
Assistant Examiner—Steven C. Bishop
Attorney, Agent, or Firm—Burns, Doane, Swecker & Mathis

[57] ABSTRACT

An exchange mechanism enables removable members such as a tool member to be secured to an irremovable machining center. The exchange mechanism comprises a cassette connectible to the tool member, and a plurality of locking members and associated actuator carried by the machining center. The actuator slides the locking members radially outwardly such that inclined faces on the locking members abut corresponding inclined faces on the cassette. The inclined faces are oriented such that a force is exerted on the cassette which has an axial component urging the cassette toward the machining center, and a radial component tending to center the cassette.

15 Claims, 2 Drawing Sheets

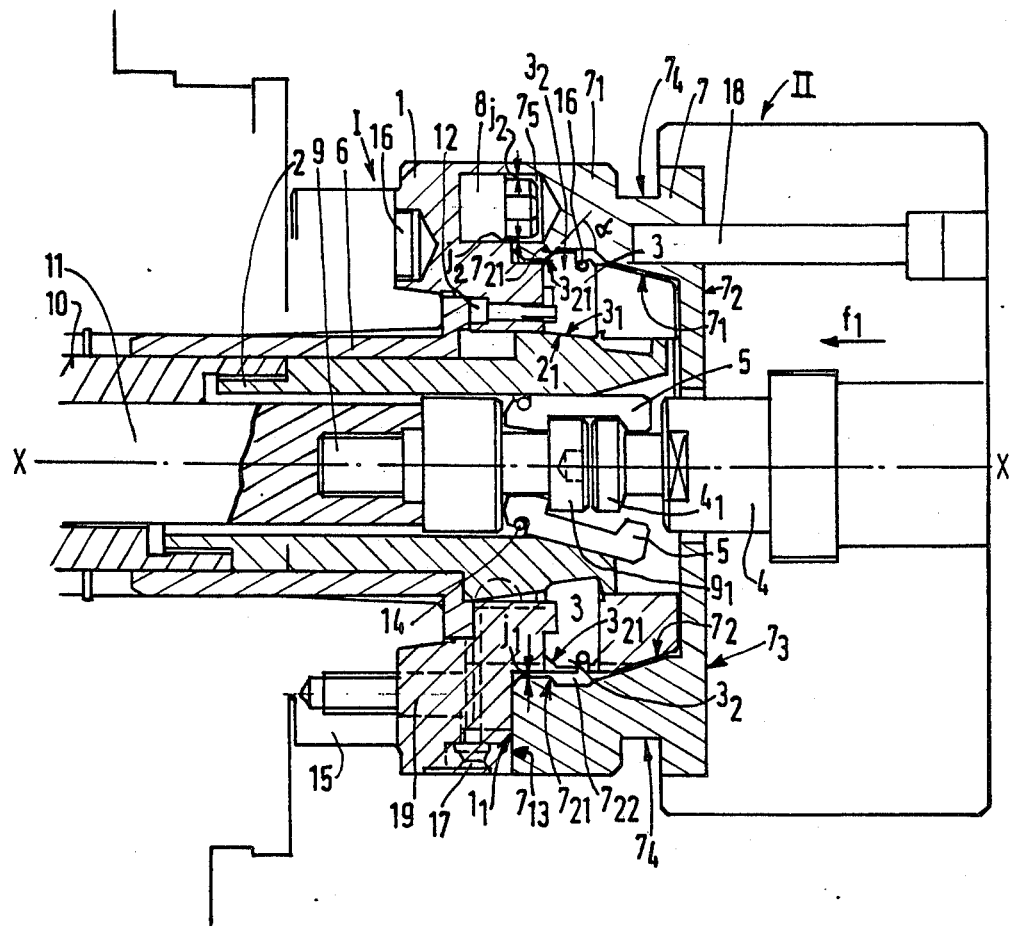

EXCHANGE SYSTEM ON AN IRREMOVABLE MACHINING CENTER

BACKGROUND OF THE INVENTION

The present invention relates to an exchange system on an irremovable machining center, such as a spindle of a processing machine, removable devices such as clamping mandrels, tool holders and similar.

In known systems, the removable device is connected directly to a part of the irremovable machining center, by a coupling means. This removable device may be automatically and rapidly removed from said machining center so as to be replaced for example by another removable device, such as a clamping mandrel, a tool holder, a lathe center holding device and similar having different dimensions, and thus allowing work pieces having different dimensions to be machined, and different tools to be used. Rapid engagement and disengagement means, generally automatic, are further provided between said removable device and said machining center.

A first known embodiment of a connection between the removable device and the machining center consists of a coupling means in the form of ring gears with radial self centering teeth, one ring gear being mounted directly on the removable device and the other directly on the machining center.

This embodiment has numerous drawbacks: it is comparatively expensive; and in particular the precision of the coupling and more particularly the centering of the removable device are insufficient for any precision manufacture and machining, since there is always play between the teeth of the ring gear which may reach several tenths of a millimeter.

In another known embodiment, the connection between the removable device and the machining center consists of a coupling means having a conical projection machined on the machining center which cooperates with the corresponding conical bore machined in a part of the removable device.

This embodiment is also costly. It is unreliable. More particularly it is very difficult, during rapid exchange of a removable device, to obtain correct introduction without shocks of said conical projection into said bore without damaging the parts of the coupling or, at least, rapidly reducing the machining precision.

The aim of the present invention is to overcome these drawbacks.

SUMMARY OF THE INVENTION

In accordance with the invention, the exchange system on an irremovable machining center, for exchanging removable clamping and/or holding devices, such as mandrels, tool holders and similar, is characterized in that when said removable device is in position on said machining center, said removable device is connecting indirectly to said machining center by means of a cassette, an inclined face of its inner face of which cooperates with an inclined face of at least one locking member which may be moved from a neutral position to a locking position during the operation of mounting and locking said removable device on said machining center, means being also possibly provided for controlling the intimate and even contact between said inclined face for the locking action.

The inclination of the whole of said faces is identical. Said inclinations is from 40° to 50°.

A play j1 exists during mounting of the assembly: cassette and removable device on/or in said machining center and continues to exist after locking by said members, thus ensuring ready mounting of said assembly on/or in said machining center and, in the locking position, the application and precise centering of said cassette on said machining center.

Said play j1 is from 0.5 to 1.0 mm at the inner diameter of the cassette.

The precision of said application and centering of the cassette on/or in said machining center, in the locking position, is from 0.007 to 0.011 mm with respect to the longitudinal axis X—X of the face of the cassette and its outer diameter.

The face of the cassette intended to be in contact with the removable device is only processed and machined for adapting it to the chosen removable device.

At least one finger is provided on the irremovable machining center, which, in the mounted and locked position of the removable device on said machining center, is housed in a recess formed in the body of the cassette.

This finger serves essentially for driving the removable device but also, by its special configuration, for facilitating mounting of the assembly: cassette and removable device on the machining center.

In face, said recess is cylindrical whereas the part of said finger which is housed in said recess is at least partially formed so that its cylindrical lateral parts are in contact with the inner face of said recess, whereas the upper and lower parts provide for a play j between them and the inner face of said recess.

Said upper and lower parts have a prismatic form.

The end of said finger is in the form of a truncated cone.

The small play j2 provides for the very small vertical movement of the cassette during the locking operation while ensuring, during assembly, the perfect precision and centering of the cassette and the removable device on the machining center.

In a particular embodiment said locking members are sliders for locking the removable device in the operating position, said sliders being movable radially under the action of the locking and unlocking mechanism.

So as to allow rapid and efficient exchange, said cassette is provided with a groove to be gripped by the operator, for transporting the assembly: cassette and removable device during an exchange operation.

To be sure of efficient locking, during mounting of the cassette and the removable device on the machining center, a duct for feeding a pressurized fluid is disposed in the body of the cassette, said duct extending to the inclined face of its inner face and being in connection with a source supplying said fluid and, possibly, with an indicator device so that the flow of said fluid is interrupted by the perfect and sealing contact between said inclined face of the cassette and the inclined face of the locking member, interruption of this flow then being displayed by said indicator device.

Other means of checking the perfect and precise locking may be used without for all that departing from the scope and spirit of the invention.

THE DRAWINGS

Other advantages and characteristics will be clear from the following description, given solely by way of example, with reference to the accompanying Figures in which:

FIG. 1 shows in section one embodiment of the invention;

FIGS. 2a and 2b show said drive finger in section through A—A and in a side view.

DESCRIPTION OF A PREFERRED EMBODIMENT OF THE INVENTION

Figure 3:
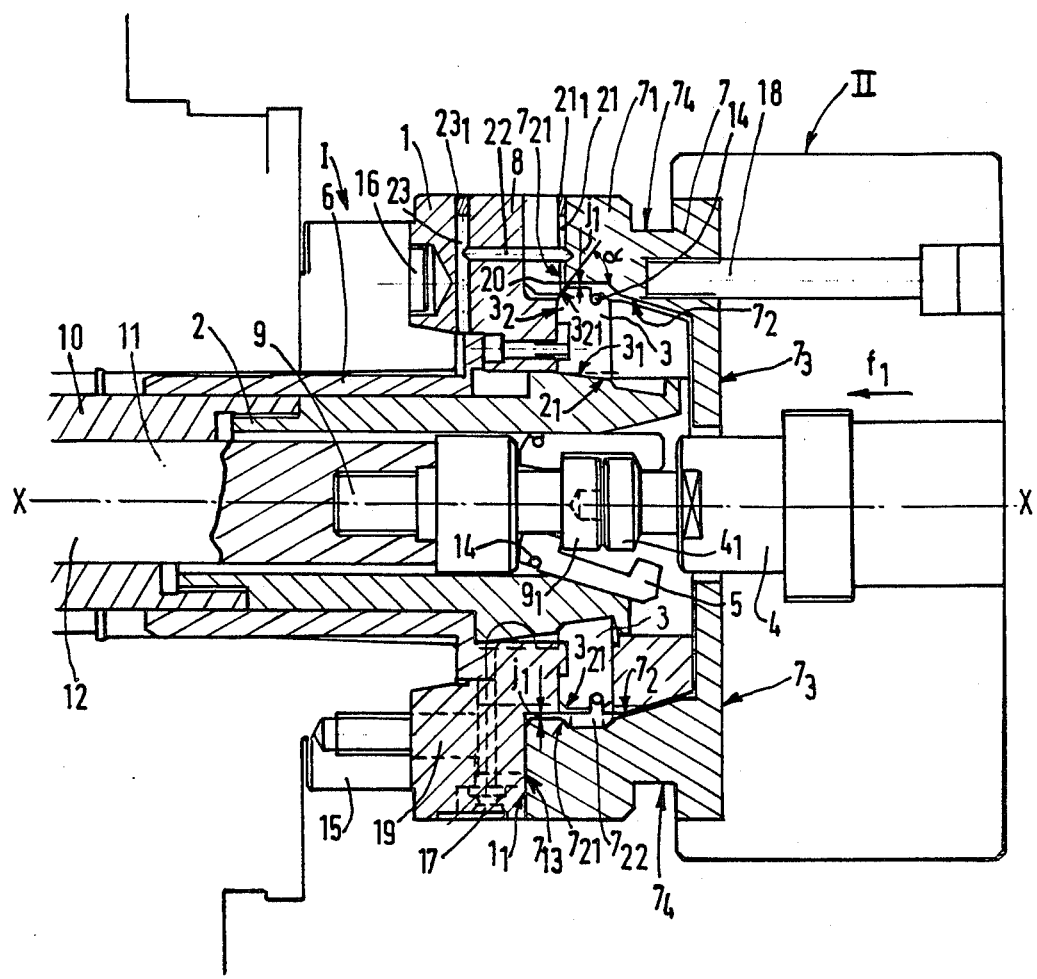
FIG. 3 shows in section the embodiment of Figure 1 with, in addition, the pneumatic means for controlling the intimate and regular contact between the inclined faces of the cassette and of the locking member respectively.

FIG. 1 shows a removable machining center I including a fitting plate 1. This machining center I may be a spindle of a machine tool or the like. In the central bore of this machining center rods 10, 11 act on an annular piston 2 which piston may move along the axis X—X in a sleeve 6 and cause, through its inclined part 2, during longitudinal movement thereof, the radial movement of sliders 3 for locking or unlocking, against spring 14, jaws 5 which hold (or release) the head 9, of the end piece 9 of the machining center I and of the head 4, of the end piece 4 of the removable device II—which may be a clamping mandrel, a tool holder, etc..In the upper part of FIG. 1, jaw 5 is shown in the locked position whereas in the lower part of FIG. 1 jaw 5 is shown in the unlocked position: the head 4, is free and the removable device II may be removed to be replaced by another, for example. Such a rapid coupling and uncoupling system with irreversible locking is known, for example, from French patent nos. 83 07093 of the 29 Apr. 1983 and 8500787 of the 21 Jan. 1985 in the name of the applicant.

Plate 1 is fixed to the body 15 of the machining center I by means of screws 19 and positioned by means of at least one stud 16. Lubrication of the system is provided by a lubricator 17. A stud screw 12 is provided for defining the radial movement of each slider 3, during locking and unlocking of jaws 5.

In accordance with the invention, the connection between the machining center I and the removable device II is provided indirectly through a cassette 7 whose vertical phase $7_3$ is only processed as a function of the kind of removable device II to be used. Cassette 7, with its face $7_3$ suitably processed and machined, is fixed to the removable device II by screws 18.

The assembly: cassette 7 and removable device II is moved along the axis X—X leftwards in FIGS. 1 and 3, in the direction of arrow f1, for example by an operator who grasps said assembly by a gripping groove 74 machined in the body 1 of cassette 7. This assembly is moved until the rear face $7_{13}$ of body 7, of cassette 7 comes into contact with the front face 1, of plate 1, at least one finger 8 penetrating into a recess $7_5$ formed in the rear part of body 7, of the cassette 7, a clearance j1 existing between telescoping surfaces of the cassette 7 and the machining center I during mounting.

Finger 8 serves essentially for driving the removable device II, but also for correctly positioning this device II. The configuration of finger 8 is shown in FIGS. 2a and 2b. It has a rear cylindrical part 8 which is fixedly mounted for example by means of a screw in plate 1; and the front end $8_2$ is for example in the form of a truncated cone, the angle of taper $\beta$ being from 25° to 35°. Between end $8_2$ and the rear part $8_1$, a median part $8_3$ is formed so that its lateral parts $8_{33}$ are cylindrical so as to be always in contact with the inner face of recess $7_5$, whereas the upper $8_{31}$ and lower $8_{32}$ parts are recessed to have a prismatic shape; these upper and lower parts $8_{31}$, $8_{32}$ are not in contact with the lower face of recess $7_5$, but a small clearance j2 exists.

This small play j2 allows finger 8 to be fitted readily and accurately in recess $7_5$ without any risk of damage or shocks, and locking of the cassette 7 and so of the removable device II by the radial outward movement of sliders 3 without any jamming or hindrance occuring, as will be seen futher on.

The slant $\gamma$ of planes of prisms $8_{31}$ and $8_{33}$ is of the order of 20° to 30°.

Other embodiments of finger 8 may be envisaged without for all that departing from the scope of the invention.

For locking the cassette and the device II once in position (see the lower part of Figure (1), it is sufficient to cause piston 2 to advance; the inclined part $2_1$ of piston 2 moves the sliders 3 radially outwardly while acting on the inclined face $3_1$ of the sliders until the obliquely inclined face $3_{21}$ of the upper part $3_2$ of the sliders come into intimate contact with the obliquely inclined face $7_{21}$ of the inner face $7_2$ of the cassette 7. The inclination of faces $3_{21}$ and $7_{21}$ is identical. In the example shown in the drawings, the inclination $\alpha$ is equal to 45°. Due to the inclination of the faces, each slider 3 imposes on the cassette a force having an axial component urging the cassette toward the machining center, and a radial component tending to center the cassette. During locking, the cassette may be pushed radially outwardly. This may take place without difficulty and without causing damage because of the play j2. The upper part $3_2$ may then be housed in the groove $7_{22}$ in face 7hd 2 of cassette 7 (see upper part of FIG. 1).

The accuracy of fitting the cassette 7 in the machining center I with respect to the longitudinal axis X—X, of face $7_3$ and the outer diameter D of cassette 7 is of the order of 0.001 mm.

Furthermore, the mounting play j1 between cassette 7 and the machining center I exists after the locking operation, thus, allowing the cassette 7 to be applied and precisely centered on said machining center I. This clearance j1 has a value of 0.5 to 1 mm at the inner diameter D of the groove $7_{22}$ of the cassette 7.

So as to ensure good operation of the locking, it may be advantageous to be able to check that the contact between faces $3_{21}$ and $7_{21}$ is perfect. A simple and efficient method consists in extending to face $7_{21}$ in duct 20 which is connected by ducts 22, 23 to a pressurized fluid supply source (see FIG. 3). Ducts 21 and 23 are sealingly closed by plugs $21_1$ and $23_1$. Duct 20 may also be connected to a device indicating stopping of the flow of pressurized fluid when the locking contact between faces $7_{21}$ and $3_{21}$ is perfect.

Numerous improvements and modifications may be made without for all that departing from the scope and spirit of the invention.

I claim:

1. An exchange mechanism for an irremovable machining center for securing thereto removable members such as clamping and holding devices, said mechanism comprising:

a cassette connectible to a front end of a removable member, said cassette including a first face inclined obliquely relative to a longitudinal axis of said machining center, said machining center and cassette respectively including first and second positioning surfaces extending in generally front-to-rear directions and disposed in axially overlapped relationship when said cassette is secured on said machining center, with a radial clearance disposed between said first and second surfaces to enable said cassette to be adjusted radially when mounted on said machining center, at least one locking member carried by said machining center and including a second face oriented at an inclination substantially corresponding to that of said first face, said locking member being displaceable from an unlocking position to a locking position wherein said first and second inclined faces contact one another in a manner exerting a force on said cassette having an axial component urging said cassette toward said machining center and a radial component tending to radially adjust said cassette for centering said cassette relative to said axis, and actuating means carried by said machining center for displacing said locking member from said unlocking position to said locking position to secure said cassette to said machining center.

2. A mechanism according to claim 1 wherein there are at least three said first faces and three said locking members.

3. A mechanism according to claim 1, wherein the inclination of said faces is from 40 to 50 degrees.

4. A mechanism according to claim 3, wherein said inclination is 45 degrees.

5. A mechanism according to claim 1, wherein said radial clearance is from 0.5 to 1.0 mm.

6. A mechanism according to claim 5 including at least one finger projecting from said machining center and received in a corresponding recess in said cassette to position the latter, said finger and said recess defining said positioning surfaces.

7. A mechanism according to claim 6, wherein said recess is cylindrical, said finger including an outer periphery comprised of cylindrical parts contacting a cylindrical wall of said recess and recessed parts forming a clearance with said wall.

8. A mechanism according to claim 7, wherein said recessed parts are of prismatic shape.

9. A mechanism according to claim 6, wherein an outer end of said finger is shaped as a truncated cone.

10. A mechanism according to claim 1, wherein said locking member is radially slidable.

11. A mechanism according to claim 10, wherein there are a plurality of said locking members.

12. A mechanism according to claim 10, wherein said actuating means includes an axially movable member having tapered surface means engaging said locking member.

13. A mechanism according to claim 1, wherein said cassette includes a groove, a movable jaw carried by said machining center, said actuating means including a surface engageable with said jaw to move said jaw into gripping engagement with said groove when said locking member is moved into its locking position.

14. A mechanism according to claim 1 including indicator means responsive to a tight engagement between said inclined faces for providing an indication of such contact.

15. A mechanism according to claim 14, wherein said indicator means comprises a fluid duct extending to an interface between said inclined faces and adapted to conduct pressurized fluid to said interface such that a tight contact between said inclined faces obstructs fluid travel to provide an indication of such contact.

* * * * *